(No Model.)

I. G. JENKINS, Dec'd.
R. C. JENKINS, Administratrix.
SHEATHING LATH MACHINE.

No. 508,545. Patented Nov. 14, 1893.

Witnesses:
J. J. Laass
C. L. Bendixon

Inventor:
Rebecca C. Jenkins
Admx of the Estate of
Isaac G. Jenkins, deceased
By Duell, Laass & Duell
Attorneys

THE NATIONAL LITHOGRAPHING COMPANY,
WASHINGTON, D. C.

UNITED STATES PATENT OFFICE.

REBECCA C. JENKINS, OF OSWEGO, NEW YORK, ADMINISTRATRIX OF ISAAC G. JENKINS, DECEASED, ASSIGNOR TO HARRIET C. JENKINS, OF SAME PLACE.

SHEATHING-LATH MACHINE.

SPECIFICATION forming part of Letters Patent No. 508,545, dated November 14, 1893.

Application filed January 25, 1892. Serial No. 419,254. (No model.)

*To all whom it may concern:*

Be it known that ISAAC G. JENKINS, deceased, late a citizen of Oswego, in the county of Oswego, in the State of New York, did invent new and useful Improvements in Sheathing-Lath Machines, of which the following, taken in connection with the accompanying drawings, is a full, clear, and exact description.

This invention relates to the class of machines which are employed for cutting grooves in the surfaces of boards and thereby convert the same into sheathing designed to be applied to the walls and ceilings of buildings for the purpose of receiving the plastering.

One of the objects of the invention is to provide a machine which shall have its top-plate, which is slotted for the protrusion of the saws and supports the board operated on, removable from the frame and thus permit interchangeable use of plates having saw-slots in different positions in connection with saws adjusted correspondingly to form grooves in different parts of the surface of the board, and also to afford ready access to the saws and their arbors when required, and which machine shall also have its pressure rollers and its saw-arbors readily removable to adapt the machine to be used as a bearing-off table at the tail of the planing machine, and shall also have its saws adjustable in their positions on the arbor to correspond to the position of the saw slots in the top plate of the machine; and to that end the invention consists in the improved construction and combination of parts hereinafter described and specifically set forth in the claim.

Figure 1:
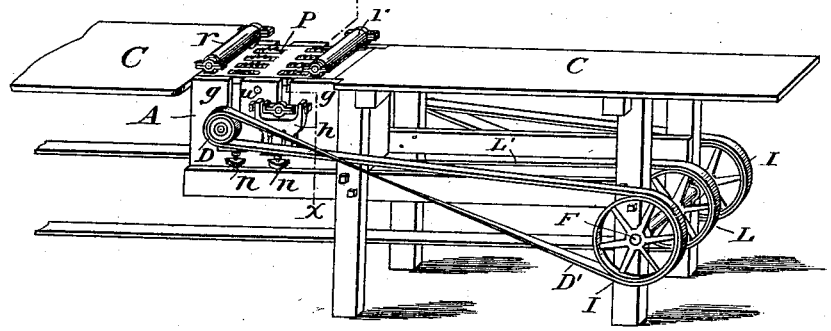
Figure 2:
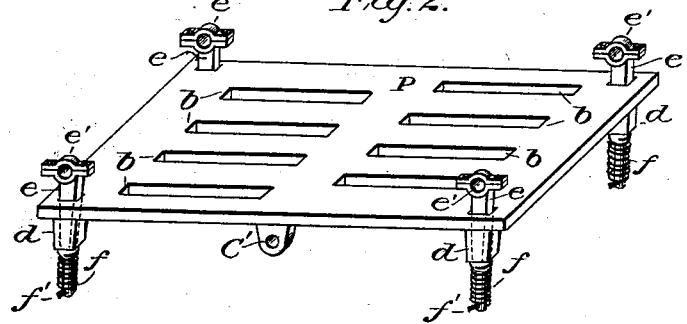
Figure 3:
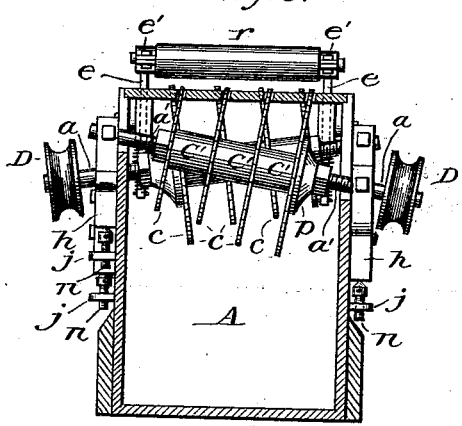
Figure 4:
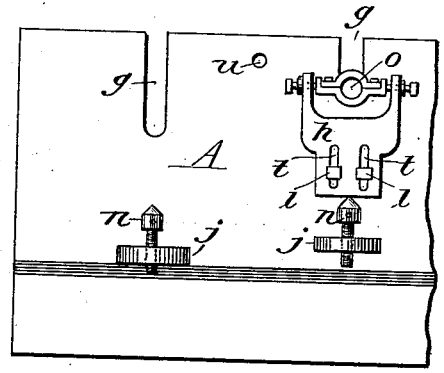
Figure 5:
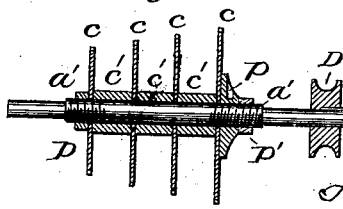

In the annexed drawings Figure 1 is a side elevation of a machine embodying the invention. Fig. 2 is an enlarged detached perspective view of the slotted top plate of the machine. Fig. 3 is an enlarged vertical transverse section on line $x, x$, Fig. 1. Fig. 4 is a detail view of the adjustable support of the saw-arbor, and Fig. 5 is a longitudinal sectional view of the adjustable mounting of the saws on their arbor.

Similar letters of reference indicate corresponding parts.

A— represents the frame of the machine, which frame is preferably of the form of a cast iron box of rectangular form in its horizontal cross-section and open at the top and bottom and secured to a table —C— so as to bring flush with the top of the latter the top of the board supporting plate —P— mounted on the frame. This plate —P— is provided with longitudinal slots —b—b—b— through which the teeth of the top portions of the circular saws —c—c—c— protrude to cut the desired grooves in the under side of the board passing over the top plate —P. To render the machine adjustable as hereinbefore stated the said plate is mounted removably on the frame —A— and in order to retain it in its position during the operation of the machine the plate is provided with downwardly extending ears —C'— which are perforated as shown in Fig. 2 of the drawings for the reception of pins passing through holes —u— in the side walls of the frame as shown in Fig. 4 of the drawings.

r—r— denote the pressure rollers which extend across the top-plate —P— and bear on the board passing over said plate in the operation of cutting the grooves in said board. To allow said pressure rollers to be removed simultaneously with the plate —P— the latter is formed with sockets or sleeves —d—d— extending vertically downward from the corners of the under side of the plate, and in said sockets are inserted vertically movable posts —e—e—, the upper ends of which are provided with journal boxes —e'—e'— in which are mounted the shafts or trunnions of the pressure-rollers —r—r.

To retain the posts —e—e— in the sockets —d—d— and cause the rollers —r—r— to press with the requisite degree on the board passing between said rollers and plate —P— the posts —e—e— are formed of sufficient length to cause them to protrude from the lower ends of the sockets —d—d— and permit spiral springs —f—f— to be connected to the posts and bear with their upper ends on the lower ends of the sockets, and with their lower ends on pins —f'— passing through the posts, as shown in Fig. 2 of the drawings.

In lifting the plate —P— from the frame —A— the pressure rollers —r—r— are carried off with the said plate, and if it is desired to detach the rollers from the plate, the same can be easily effected by simply removing the pins —f'—f'— and drawing the posts up and out of the sockets.

a—a— represent the arbors of the circular saws —c—c—c. Said arbors extend through vertical slots —g—g— in the sides of the frame —A— and extending through the top thereof to allow said arbors to be adjusted vertically and to be removed from the machine when desired.

For cutting dove-tailed grooves in the boards passing over the top-plate —P—, the said arbors are disposed inclined in opposite directions as illustrated in Fig. 3 of the drawings and are mounted in journal boxes —O— which are pivoted to pedestals —h— axially at right angles to the arbors, said journal boxes being thus allowed to accommodate themselves to the inclinations of the arbors. The teeth of the top portion of the saws protrude through the slots —b—b—b— of the top-plate —P— and in order to cause them all to protrude to the same degree, the saws are made of different diameters and the pedestals —h—h— which support the arbors of the saws are connected to the frame —A— vertically adjustable preferably by means of vertical slots —t—t— in the pedestals and set-screws —l—l— passing through the slots and into screw-threaded holes in the side plates of the frame —A—. To insure the retention of the pedestals in their adjusted positions the frame —A— is provided with horizontal projections —J—J— having vertically through them screw-threaded eyes in which are inserted the screws —n— which bear against the bottoms of the pedestals and thus support the same.

In order to allow the saw-arbors to be removed from the machine when it is desired to use the frame of the machine for simply carrying off the boards issuing from the planer to which said machine is connected, the caps of the journal-boxes are made removable to allow the saw arbors to be lifted out of the frame —A—.

To adapt the machine for cutting grooves at different distances apart the arbor —a— is formed with right and left screw-threaded portions —a'—a'— between which are the saws —c—c—c— and spacing blocks —c'—c'—c'— mounted removably on the arbor. By means of nuts —p—p— on the screw-threaded portions —a'—a'—, the saws and spacing blocks are clamped in their requisite positions. The nut on the portion of the arbor nearest the pulley —D— is of the form of a large collar having sockets for the application of a spanner, and on the outer side of this nut bears a jam nut —p'—. In adjusting the saws the aforesaid large nut is first set in its requisite position, and the saws and spacing blocks are slipped successively on the arbor and clamped in position by tightening the nut —p— on the opposite end of the arbor. In this manner a very accurate adjustment is obtained.

The saw arbors —a—a— receive rotary motion by means of pulleys —D—D— on the ends of the arbors and connected by driving belts —D'—D'— to pulleys —I—I— on a counter-shaft —F— which is journaled in suitable bearings on the frame of the table —C— and has secured to it the driving pulley —L— which is connected by a belt —L'— to a suitable motor, not shown.

What is claimed as new, and desired to be secured by Letters Patent, is—

In combination with the tail-board of the planer, the frame —A— secured stationary in its position, and supporting the saw arbors, the plate —P— mounted on the said frame and removable therefrom, and the pressure rollers mounted on said plate and removable with the same, as set forth.

Dated Oswego, New York, December 5, 1891.

REBECCA C. JENKINS, [L. S.]
*Administratrix of the estate of Isaac G. Jenkins, deceased.*

Witnesses:
MAY CANDEE HANCOCK,
LOUIS C. ROWE.